United States Patent [19]

Essex

[11] Patent Number: 5,328,509

[45] Date of Patent: Jul. 12, 1994

[54] VISCOUS FLUID DISPENSING APPARATUS

[75] Inventor: James A. Essex, Columbus, Ohio

[73] Assignee: J. E. Grote Company, Inc., Blacklick, Ohio

[21] Appl. No.: 790,557

[22] Filed: Nov. 12, 1991

[51] Int. Cl.$^5$ .............................................. B05C 5/00
[52] U.S. Cl. ..................................... 118/24; 118/302; 118/324; 118/DIG. 4
[58] Field of Search ................... 118/17, 18, 302, 324, 118/DIG. 4, 24

[56] References Cited

U.S. PATENT DOCUMENTS

| | | | |
|---|---|---|---|
| 1,062,661 | 5/1913 | Panoulias | 118/17 |
| 3,318,281 | 5/1967 | Plegat | 118/302 |
| 4,031,268 | 6/1977 | Fairbairn | 118/302 |
| 5,072,687 | 12/1991 | Mitchell et al. | 118/37 |
| 5,136,970 | 8/1992 | Saito et al. | 118/DIG. 4 |

*Primary Examiner*—W. Gary Jones
*Assistant Examiner*—John Hoffmann
*Attorney, Agent, or Firm*—Robert E. Stebens

[57] ABSTRACT

A dispensing apparatus is provided for application of a viscous sauce to a pizza shell. The apparatus includes a distribution roller system in combination with a waterfall dispensing device to form a thin sheet of the sauce that is discharged onto the roller which then throws the received sauce in droplet form onto the pizza shell in a uniform thickness layer. The distribution roller system in one embodiment of the apparatus includes a single roller formed with a plurality of conical projections arranged in angularly spaced axially extending rows for receiving the sauce from the waterfall dispensing device and revolved at a speed to throw the sauce in a generally downward direction in a shower of droplets. Another embodiment of the apparatus includes a pair of these rollers revolved in opposite directions and disposed in a generally horizontal plane with the second roller intercepting sauce thrown horizontally and upwardly from the first roller and then throwing the collected sauce in a downward direction resulting in confinement of the band of dispersion. A shield is provided in combination with the second roller to aid in the confinement process. In a further embodiment of the apparatus, a mask mechanism is provided in association with the dual roller dispenser to confine the application of sauce to a predetermined surface area of a pizza shell.

24 Claims, 9 Drawing Sheets

VISCOUS FLUID DISPENSING APPARATUS

FIELD OF THE INVENTION

This invention relates in general to dispensing apparatus for applying a fluid substance to a surface of an article that is to be coated with such substance. It relates more particularly to a dispensing apparatus that is operative to apply a viscous fluid to an article surface that breaks the viscous fluid up into small particles or droplets which are then distributed in a uniform thickness layer onto the upper surface of a receiving article.

BACKGROUND OF THE INVENTION

The dispensing apparatus of this invention has initial utility in the field of food product manufacturing and, in particular, has utility with respect to the preparation and forming of pizza. Pizza comprises a base shell of pastry material onto which various ingredients are placed and which include not only the meat and cheese products customarily applied, but invariably includes a tomato sauce that is first applied to the pizza shell prior to application of the other solid food ingredients. It is highly desirable that the tomato sauce be applied in a uniform thickness layer to obtain consistency in the quality of the product and in particular to obtain uniformity in the taste of a pizza throughout its entire extent.

Manufacturing of pizza on an assembly line basis such as in preparing large quantities for wholesaling as a frozen food product has resulted in development of various types of machines for application of the ingredients to the pastry shell forming the basic component of a pizza. Attempts have also been made to provide mechanized applicators for the tomato sauce that is initially applied to a pizza shell. One such mechanism that has been used is generally designated as a waterfall type dispenser. Such a dispenser comprises a feedplate having a surface which is oriented in a relatively steep incline and positioned above a conveyor along which the pizza shells will be transported in serial sequence. A roller device is provided to pick up the viscous tomato sauce from a reservoir and apply it to an upper end of the inclined feedplate. The feedplate has a transverse width which is substantially equal to the diameter of the pizza shells to which the sauce is to be applied. The sauce gravitates downwardy over the surface of the feedplate in a thin sheet toward the lower end from which it is discharged and deposited by gravity onto the pizza shell traversing the space beneath the feedplate. While a waterfall-type dispensing apparatus does perform the general objective of applying a viscous tomato sauce in a layer on the pizza shell, such apparatus has not been found fully satisfactory as it is incapable of applying the sauce in a uniform thickness layer. A primary reason for the waterfall-type dispensing apparatus failing to obtain the uniform thickness distribution is an inherent characteristic of viscous fluids. Tomato sauce is relatively viscous and as a consequence, even though it may be in a relatively uniform thickness sheet when flowing downwardly over the inclined surface of the feedplate, it tends to coagulate and form streams or rivulets as it flows off the discharge end which tend to concentrate the sauce and prevent it from flowing in a uniform thickness layer onto the pizza shell. Those streams are not of a continuous nature nor do they form at some fixed points across the transversely extending discharge end edge of the feedplate. The streams are of an intermittent nature resulting in indeterminate and varied lengths as well as variations in transverse spacing and cross-sectional size. Because of the viscous nature of the sauce, there is a cohesive characteristic exhibited with the sauce tending to hang onto the feedplate, thereby accentuating the irregularity of the conformations of the streams of sauce discharged with relatively large globules being formed at times. Consequently, the sauce is deposited on the pizza shell in dispersed concentrations which, even though they will tend to spread transversely over the shell's surface, will produce an uneven layer of non-uniform thickness.

Further complications in the mechanized application of tomato sauce to pizza shells is a result of the sauce products that are available. Different manufacturers produce sauces that have different viscosity characteristics, and thus, a manufacturer of pizza must continually monitor the operation of a sauce dispensing machine to assure that changes in the viscosity of the sauce do not seriously affect the deposit of the sauce onto the pizza. Even a same manufacturer may have variations in the viscosity of its own product as between different containers or batches of the sauce. Also, tomato sauces invariably include small particles of solid food products which may be from the tomatoes of which the sauce is manufactured or other food products incorporated in the sauce such as spices. Such solid food particles may also affect the flow characteristics of the sauce in an adverse manner and further destroy the uniformity in thickness of the layer of sauce from the feedplate onto the pizza shell.

SUMMARY OF THE INVENTION

A basic embodiment of the sauce dispensing apparatus of this invention comprises, in combination, a waterfall-type dispenser for initial forming of a layer of sauce of a transverse width to cover a pizza shell and a distribution roller positioned to receive the layer of sauce as it is discharged from the feedplate of the waterfall-type dispensing component and operating to break the layer of received sauce up into small droplets that are distributed in a uniform thickness layer onto the pizza shell. The distribution roller employed in combination with the waterfall dispensing component of this invention has a surface formed with a number of projections extending radially outward and disposed in a spaced apart pattern which function to initially pull the sauce from the discharge end of the inclined feedplate and to then subsequently discharge the collected sauce from the roller by the combined effect of gravity and centrifugal force. This operation results in breaking the sauce up into relatively small sized droplets which are then, in effect, deposited onto the pizza shell in the form of a shower which results in the uniform thickness deposit.

The distribution roller employed in the dispensing apparatus of this invention has a plurality of projections which are of a general frusto-conical configuration. These projections are distributed over the effective surface of the roller in a pattern which will insure that the sauce will be broken up into small droplets of relatively uniform size and that they will then be discharged in a uniform pattern. In accordance with this invention, those projections are arranged in axially extending rows on the roller with the rows being angularly spaced in a uniform manner. Also, in accordance with this invention, the projections as between adjacent axial rows are axially displaced in offset relationship to better assure that there will be effectively substantially complete coverage throughout the length of the roller of surface areas for engaging with the sauce. This is achieved by forming the projections to be of a size and spacing them in a manner such that projections in alternate rows will be positioned in the spaces between the projections in next adjacent rows. This configuration and arrangement of the projections thus effectively forms pockets on the surface of the roller which better enables the roller to receive and temporarily hold the sauce and to thereafter enable the sauce to be broken up into small droplets or particles.

As previously noted, the projections formed on the roller are of a frusto-conical configuration with the projections in the illustrated embodiment that has been utilized and found particularly effective being circular in cross-section. While the outermost portions of the projections are of a size such that there are spaces between them when viewed in a circumferential direction, the base portions of those projections do overlap and cooperatively form axial walls.

In accordance with another aspect of this invention, a modified viscous fluid dispensing apparatus is provided having a plural-roller distributor for transferring of viscous fluid from an inclined feedplate to an evenly distributed layer of uniform thickness on a sheet-form receiving element such as a pizza shell. This modified plural-roller distributor includes two elongated rollers that are of identical construction and are similar to the roller of the basic embodiment having surfaces formed with a plurality of frusto-conical projections. The two rollers are disposed in parallel relationship and are mounted on a support frame to lie in a generally horizontal plane with a first one of the roller disposed in underlying parallel relationship to the lower transversely extending edge of the feedplate to receive the sauce discharged from the plate. A drive motor mechanically coupled with the roller revolves them in opposite directions with the first roller engaging with the sauce discharging from the plate at a point on its periphery that is then moving in a downward direction and at a side away from the second roller. A portion of the sauce thrown from the first roller is intercepted by the second roller, thereby limiting the extent to which the first roller throws the sauce in a downstream direction. The second roller collects some of the sauce thrown from the first roller and it then subsequently throws that collected sauce onto the pizza shell in a direction toward the first roller, thereby cooperating with the first roller to confine the dispensing action to a relatively narrow transverse band and enhancing the uniformity in distribution and thickness of the layer of sauce applied to the pizza shell. A shield is placed in partially covering relationship to the second roller to prevent it from throwing sauce either upwardly or in a horizontal direction.

In accordance with a further aspect of this invention, the modified dispensing apparatus having a plural-roller distributor is also provided with a mask mechanism operative to restrict the application of the sauce to a predetermined surface area. This mask mechanism includes a mask plate that is supported for displacement along a generally horizontal path in overlying and coordinated movement with respect to a pizza shell. An aperture is formed in the mask plate that is of appropriate size and configuration to expose only a specified portion of the pizza shell and thereby limit the application of sauce to only that area. While the roller distributor produces a continuous stream of sauce of predetermined transverse width, the sauce which does not pass through the aperture will be collected on the top surface of the mask plate while it is being displaced in conjunction with the pizza shell. A scraper mechanism is also provided to remove the sauce collected on the mask plate after the conclusion of each application operation to prevent accumulation of sauce that could adversely affect the uniform application of the sauce.

These and other objects and advantages of this invention will be readily apparent from the following detailed description of the illustrative embodiments and from the accompanying drawings.

DESCRIPTION OF THE DRAWING FIGURES

DESCRIPTION OF THE ILLUSTRATIVE EMBODIMENTS

Figure 1:
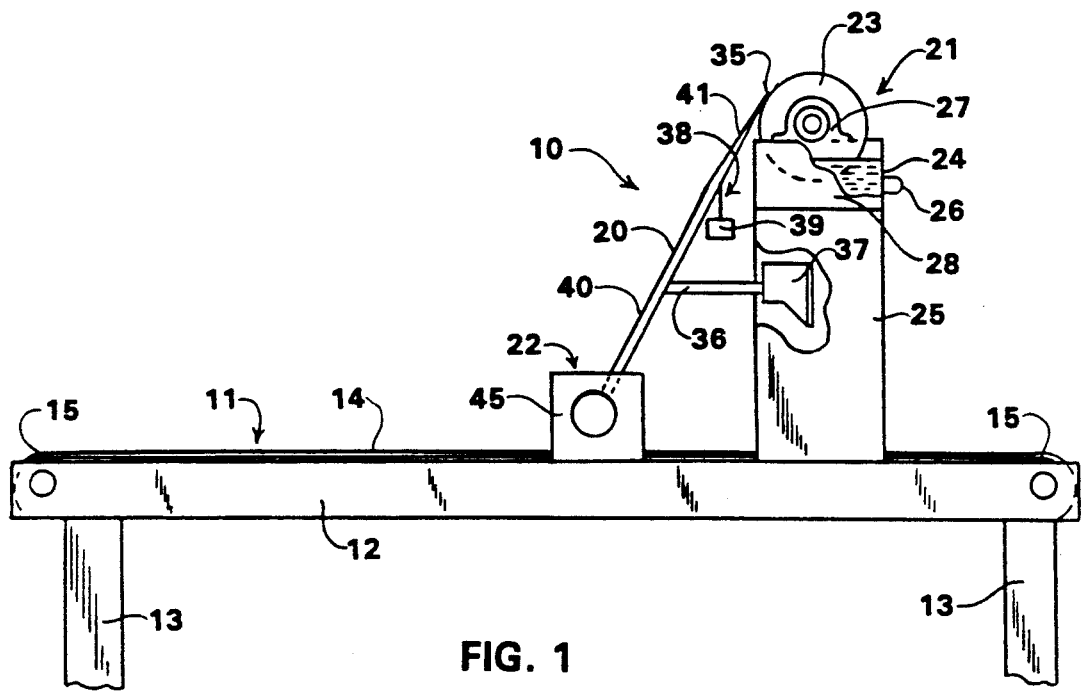
FIG. 1 is a side elevational view of a viscous fluid dispensing apparatus embodying this invention and positioned in association with a conveyor on which pizza shells are transported in seriatim for application of the sauce.
Figure 2:
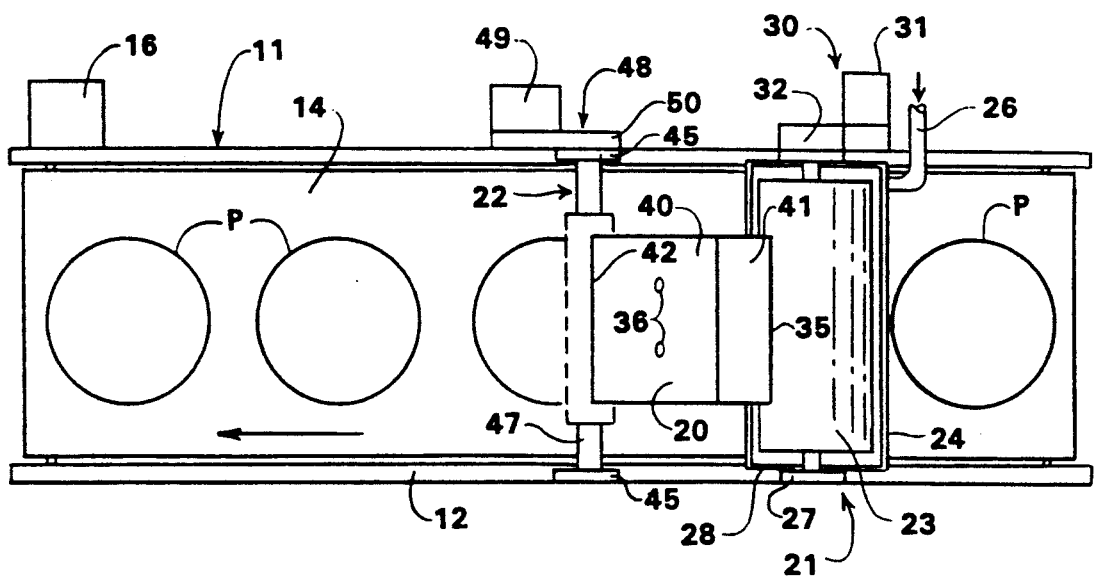
FIG. 2 is a top plan view of the dispensing apparatus in combination with a conveyor.
Figure 3:
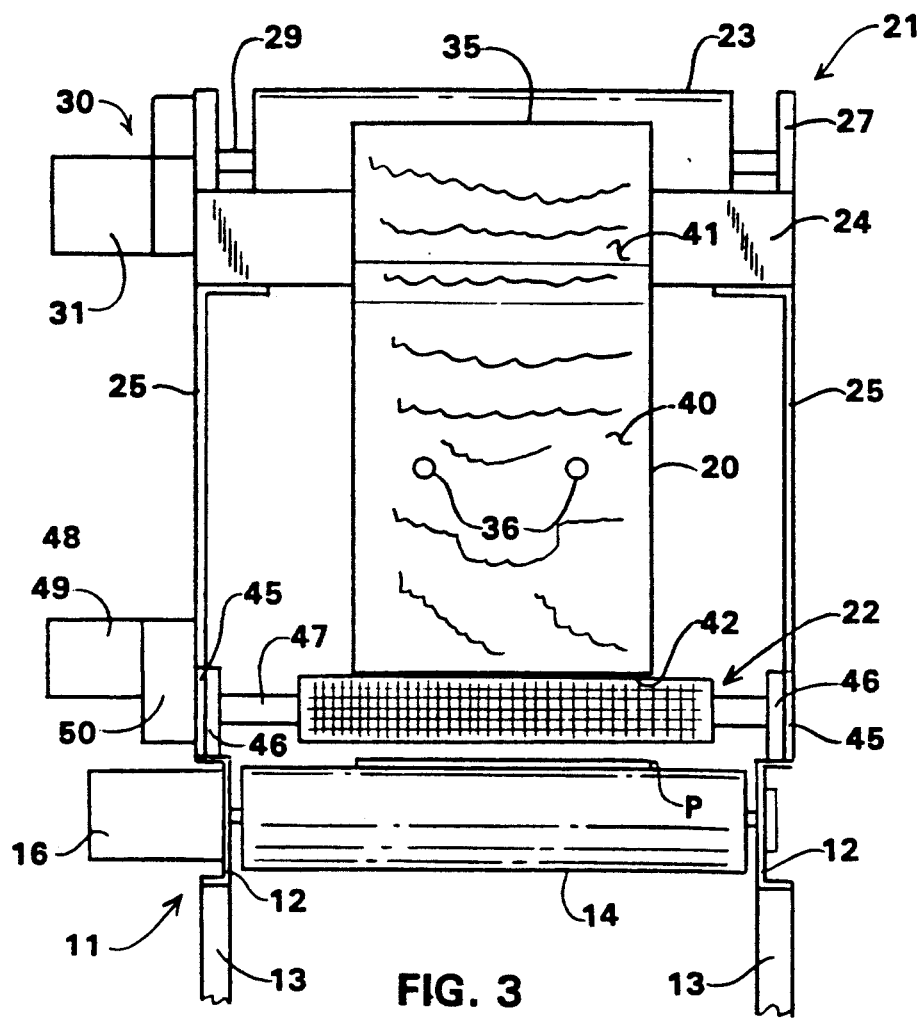
FIG. 3 is an end elevational view of the dispensing apparatus and conveyor combination.

Having reference to FIGS. 1, 2 and 3 of the drawings, a viscous fluid dispensing apparatus designated generally by the numeral 10 embodying this invention is shown in association with a belt-type conveyor 11 which transports pizza shells P onto which the dispensing apparatus distributes a viscous fluid sauce. While a conveyor 11 of the belt-type is shown, it will be understood that other means of transport of a pizza shell along a horizontal plane relative to the dispensing apparatus could also be utilized. The belt-type conveyor is shown as it is a simple type of structure and is particularly suited for incorporation into an assembly line type of operation for mechanized production of pizzas. This conveyor 11 includes a pair of elongated, spaced parallel side rails 12 that are rigidly interconnected to each other by transversely extending structural elements (not shown) to form a unified rigid structure. This conveyor is shown as provided with support legs 13 that are of a length to position the conveyor at a convenient height for use by operators and control personnel. Mounted on this structural frame is a conveyor belt 14 that is trained around respective support rollers 15 which extend transversely between the side rails 12 and are journalled in bearings mounted on those rails. One of the rollers also functions as a drive roller and has an electric drive motor and speed reduction mechanism 16 coupled thereto and operable to effect revolving of the belt 14 with the upper run moving in the direction as indicated by the arrows in FIG. 2. It will be noted that the side rails 12 are spaced transversely apart a distance such that they will accommodate a conveyor belt 14 of sufficient width to transport the larger sized pizza shells that will be processed by the apparatus. The largest type shells are generally of the order of 355 mm in diameter, and thus, the belt is advantageously about 460 mm wide to provide sufficient marginal edge space to collect sauce which may not be placed on the pizza shells. Pizza shells P are placed on the conveyor belt 14 at the end opposite the roller coupled with the drive motor and are transported in serial sequence toward the opposite end where they are discharged to either other processing conveyors or into packaging devices. An infeed conveyor (not shown) may be disposed in preceding relationship to the conveyor 11 to facilitate positioning of the pizza shells in serially aligned and appropriately spaced relationship. For the purposes of describing this embodiment of this invention, it is sufficient to merely note that a conveyor is provided for transport of the pizza shells along a longitudinal path and in a substantially horizontal plane. The speed of movement of the conveyor belt is adjusted to be in accordance with the rate of dispensing of the fluid that is achieved by the dispensing apparatus to effect application of a layer of the viscous fluid sauce of desired thickness on the pizza shells.

Supported on the side rails 12 of the conveyor 11 is the dispensing apparatus 10 of this invention. This dispensing apparatus includes an inclined feedplate 20, a fluid applicator 21 for depositing of the viscuous fluid sauce onto the upper end of the feedplate in a continuous stream and a fluid distribution roller 22. It will be noted at this point that the inclined feedplate 20 and the fluid applicator 21 form the basic structure of a dispensing apparatus that has been heretofore utilized in applying a layer of sauce to the upper surface of a pizza shell and is generally identified and known as being of a "waterfall type". A waterfall type of dispensing apparatus consists essentially of only those two components as the sauce or viscous fluid material is merely discharged from the lower end edge of the feedplate 20 and is deposited by gravity onto the receiving surface of the pizza shell. In accordance with this invention, a fluid distributor roller 22 is added to that basic waterfall dispensing structure to obtain an improved distribution of the viscous fluid in a substantially uniform thickness layer on the receiving article which is illustrated as being a pizza shell. Its construction and functioning to obtain this improved performance in dispensing and applying of a viscous fluid to a pizza shell will be described and explained in greater detail in the following paragraphs.

The fluid applicator 21 incorporated in the illustrative embodiment of the dispensing apparatus of this invention is of a construction that is typical in the conventional waterfall dispensing mechanisms as is the feedplate 20. As can be seen in the drawings, specifically FIGS. 1, 2 and 3, the fluid applicator includes an elongated pickup cylinder 23 which is supported for revolution about a horizontal axis and having a lower arcuate portion of the cylinder disposed in an open-topped tank 24 that is partially filled with a quantity of the viscous fluid material which, in the case of pizza shells, is commonly a tomato sauce and which is indicated at various points in the drawings by the letter S. Support of the tank 24 along with its pickup cylinder 23 at an elevation above the upper run of the conveyor belt 14 to permit gravity flow of the sauce S during the initial part of its dispensing movement is effected by a pair of upright brackets 25 secured at their lower ends to the side rails 12 at each side of the apparatus. The upper ends of these brackets 25 are secured to the tank 24 and thus hold the tank in a fixed elevated position with respect to the conveyor belt with the pickup cylinder 23 thus extending transversely across the belt with respect to the belt's direction of movement. Suitable means is provided for effecting input of the sauce S to the tank 24. Details of this means are not shown in the drawings as it does not form a part of the invention and it will suffice to note that such means will include a pump having an intake associated with a supply container of the sauce and routes the sauce upwardly through a tube 26 that is connected to the tank and discharges the sauce into the interior of that tank. Automatic control mechanisms may also be provided to control the operation of the sauce supply means so that the quantity of sauce in the tank is maintained at a level to assure that a sufficient portion of the pickup cylinder 23 will be immersed in that sauce. Again, such automatic control mechanisms are not illustrated as they are known in the art and do not form a part of this invention except to the extent that they aid in the automatic operation of the apparatus. It will also be understood that manual control mechanisms may be utilized or that sauce may be manually added to the tank at periodic intervals. Support of the pickup cylinder 23 in association with the tank 24 is effected by a pair of bearing elements 27 that are mechanically secured to opposite end walls 28 of the tank 24. End portions of an axle 29 secured to and projecting from opposite ends of the pickup cylinder 23 are journalled in those bearing elements 27. One of the axle end portions extends through its respective bearing and is mechanically coupled to a drive mechanism 30. This drive mechanism 30 is shown as including an electric drive motor 31 mechanically coupled to the axle 29 through a gear reduction mechanism 32. Control and energizing circuitry to the motor 31 is not shown as such circuitry will be readily apparent to those skilled in this particular art. In general, that circuitry would be operable to energize the motor 31 and revolve the pickup cylinder 23 whenever the remaining components of the dispensing apparatus are placed in operation. It will be noted that the gear reduction mechanism 32 is designed to result in revolving the pickup cylinder 23 at a selected speed that will be effective in causing the cylinder to pick up the sauce and carry a specified quantity at a given rate for placement onto the feedplate 20 to effect the desired operation of the apparatus. As to operation of the fluid applicator 21, it will be sufficient at this point to note that the pickup cylinder 23 will be revolved at a rate such that it will pick up a coating of sauce that adheres to its surface and carry that sauce to a point where it will be deposited onto the feedplate 20 at a sufficient rate to develop a layer of sauce that flows downwardly over that feedplate and discharges from a lower end edge to apply a layer of predetermined thickness to a pizza shell.

The feedplate 20 is formed from a planar sheet of suitable material, a resin plastic such as nylon or Teflon, and is supported in a relatively steeply inclined orientation on the apparatus. In this illustrative embodiment, it is supported by means enabling it to readily position itself automatically to place an upper transversely extending end edge 35 into contacting tangential relationship to the surface of the pickup cylinder 23. This mechanical support of the plate 20 is effected by a pair of support rods 36 that extend longitudinally with respect to the apparatus and the conveyor belt with the rear ends thereof being mechanically coupled to support brackets carried on the bottom of the tank 24. The opposite ends of the support rods 36 extend into receiving sockets formed in the plate 20. These ends of the rods 36 and the receiving sockets are cooperatively sized to permit the plate to pivot to a certain degree with respect to the rods while maintaining the mechanical interconnection and securing the plate to the rods, although permitting removal for purposes of cleaning. This pivotal interconnection of the plate with respect to the rods enables the plate to maintain its contacting engagement at its upper end edge 35 against the pickup cylinder surface. To better assure that a contacting engagement is maintained, a counterweighting mechanism 38 may be provided as is shown in the illustrative embodiment. This counterweighting mechanism 38 consists of a weight 39 coupled by a cable to the rearwardly facing side of the plate and functions to maintain the upper end edge in secure engagement against the surface of the pickup roller.

Referring specifically to FIG. 1, it will be seen that the feedplate 20 is mounted to extend in an upwardly inclined direction with the upward inclination being in the range of 70-75 degrees. This results in the upper surface 40 of the plate being at an angle which is advantageous for effecting the gravity downflow of the sauce over that upper surface. It will be noted that this surface 40 includes an upper marginal end portion 41 that is inclined in the direction of the rear face, and thus, results in forming of a relatively sharp upper end edge 35. This is desired to effect a proper separation of the sauce carried by the pickup cylinder 23 and cause it to flow onto this upper marginal end portion 41 and thereafter to flow downwardly over the upwardly facing surface 40 of the feedplate.

In this illustrative embodiment, the feedplate 20 is of a width that is at least equal to the diameter of the pizza shells P which are to be coated with the sauce. This assures that the sauce will be distributed across the entire diameter of the pizza shell P as it passes under the dispensing apparatus. The sauce flows downwardly over the surfaces 40 and 41 in a sheet of relatively uniform thickness and at a rate of flow that is a function of the sauce's viscosity and angle of inclination of the feedplate. However, as previously noted in the discussion of the prior art, the sauce discharges from a lower end edge 42 of the feedplate in a non-uniform manner in the nature of irregularly configured streams that are intermittent and of indeterminate length as well as being at randomly varied locations along the transversely extending lower end edge. To better assist separation of sauce from the plate at the discharge end, the under face of the plate is formed with a lower marginal edge surface 43 that is disposed at an angle to the upper surface 40, thereby forming a sharp edge 42 as shown in FIG. 7.

To provide improved performance in applying a uniform thickness layer of the sauce to a pizza shell P, the apparatus of this invention incorporates a fluid distribution roller 22. This roller is supported to receive the sauce S as it is discharged from the lower end edge 42 of the feedplate 20 and is supported to be positioned in parallel relationship to that lower end edge. Support of the distribution roller is obtained by a pair of support brackets 45 secured to opposite side rails 12 of the conveyor 11. Each of the support brackets 45 is provided with a bearing element 46 in which are journalled opposite ends of a support axle 47 of the distribution roller 22. The support axle 47 extends outwardly from one of the bearing elements 46 and is mechanically coupled with a roller drive mechanism 48. This roller drive mechanism 48 includes an electric drive motor 49 that is mechanically coupled with the axle 47 through a gear reduction mechanism 50. In the illustrative embodiment for the particular dimensions of the components of the apparatus, it has been found advantageous to revolve the distribution roller at a speed of about 400 rpm.

Figure 4:
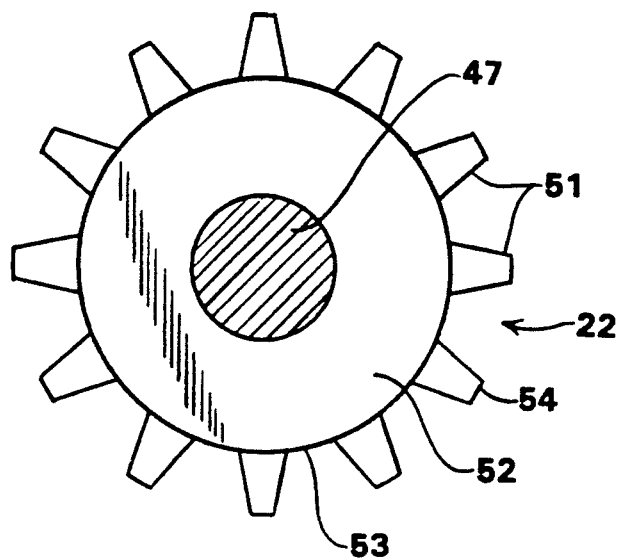
FIG. 4 is a sectional view of the distribution roller on an enlarged scale taken along line 4—4 of FIG. 3.
Figure 5:
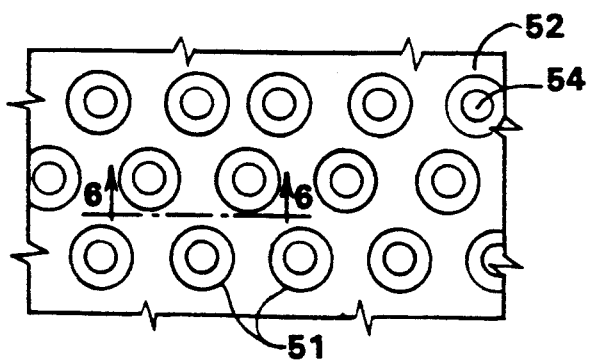
FIG. 5 is a fragmentary developed plan view of the surface of the distribution roller.
Figure 6:
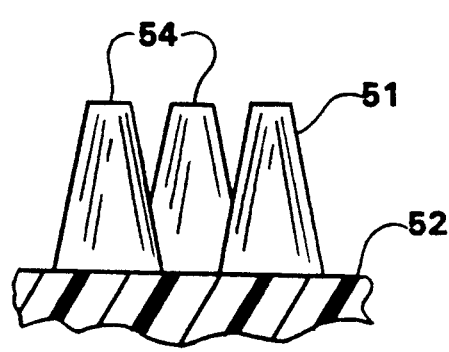
FIG. 6 is a fragmentary sectional view of the distribution roller taken along line 6—6 of FIG. 5.

In accordance with this invention, it has been found particularly advantageous to construct the distribution roller 22 to have an operative surface formed with a plurality of projections 51 formed on a base cylinder 52 that is mounted in fixed relationship on the axle 47 as shown in FIG. 4. This base cylinder in the illustrative embodiment has an outer surface 53 that is 40 millimeters in diameter. Integrally formed with the base cylinder 52 are the projections 51 which are oriented to project radially outward with respect to the surface 53. The particular structure and configuration of the base cylinder and its projections can be best seen in FIGS. 4, 5 and 6. Each of the projections 51 is of a frusto-conical configuration and which, in this illustrative embodiment, are of circular cross-section. The base end of the projections lie in the cylindrical surface 53 and the surfaces of the projections thus converge outwardly to a relatively smaller diameter outer end having a flat end surface 54. The dimensions of the projections in this illustrative embodiment are that the base end has a diameter of the order of 7.5 millimeters and the outer ends are of the order of 6 millimeters in diameter. Each projection is of a length of the order of 8 millimeters with the top flat ends 54 thus being disposed in a cylindrical plane having a diameter of the order of 55 millimeters. These projections are arranged in twelve axially disposed rows that are angularly disposed to each other. They are axially spaced apart approximately 10 millimeters, and thus, there will be a space between the lower base ends of each of the projections as can be seen in FIGS. 5 and 6. As between adjacent rows as can be seen in FIG. 5, the projections are disposed in offset relationship of symmetrical configuration with the projections in alternate rows thus being centered in the open space of pairs of projections in the next adjacent row. This results in the projections forming, as between adjacent rows, a radially outward projecting wall surface which is effectively complete throughout the radial extent of the projections as can be best seen in FIG. 6. Thus, even though the projections are of a conical shape which has been found advantageous for performance of their function of carrying the viscous fluid and then releasing the fluid for discharge, the roller, in effect, has a number of axially extending blades that are effective in pulling the viscous fluid from the lower end edge 42 of the feedplate 20 and carrying it around a circular path during the course of revolution of the roller 22.

Figure 7:
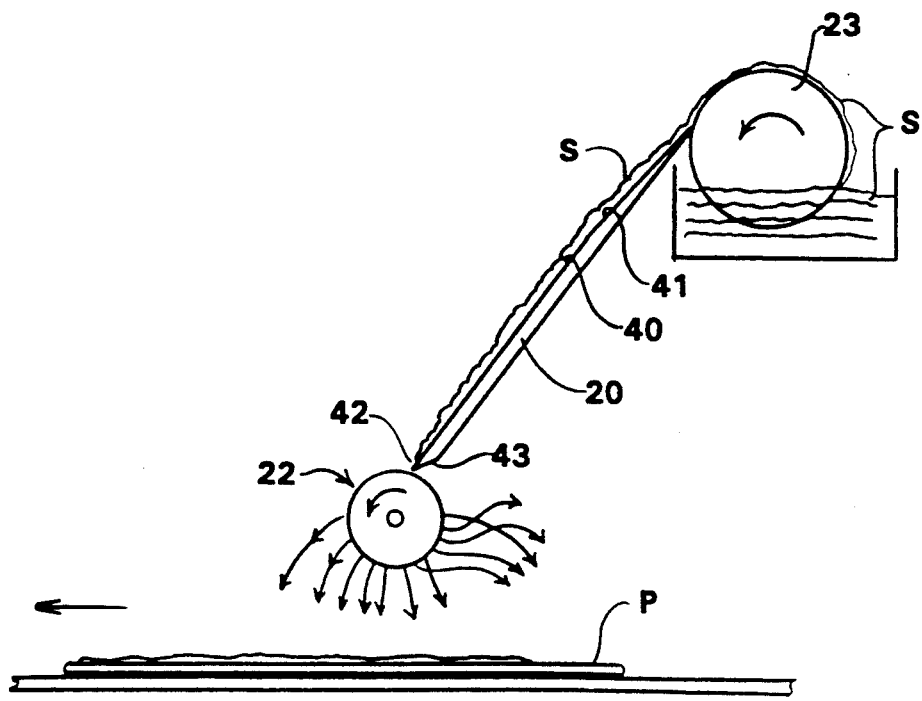
FIG. 7 is a diagrammatic side elevational view of the apparatus components illustrating their functioning in dispensing of a viscous fluid.

Functioning of the dispensing apparatus of this invention can be best seen in the diagrammatic illustration of FIG. 7 which is a vertical side view of the components. As the pickup cylinder 23 of the fluid applicator 21 revolves, the surface of that cylinder collects a relatively thin layer of the viscous fluid or sauce on its exterior surface through adhesive engagement. This layer of sauce is relatively thin and on the 150 mm cylinder revolving at a speed of about 100 rpm is of the order of 1 mm thick. The sauce as it is picked up on the lower portions of the cylinder immersed in the sauce contained in the tank 24 is thus pulled upwardly and around the circular path until it reaches the upper end edge 35 of the feedplate 20. At that point with the end edge having a relatively sharp knife-like configuration, the sauce will thus be scraped off from the surface of the cylinder and thereby caused to flow onto the inclined upper end portion 41 of the feedplate. Thereafter, the fluid will flow by operation of gravity downwardly over the surface 41 and the surface 40. The undesirable dispensing action that occurs with the simple waterfall apparatus of the prior art does not occur with the dispensing apparatus embodying this invention as the distribution roller 22 is positioned so that the upper or outer flat ends 54 of the projections revolve in a cylindrical path that is disposed closely adjacent to the lower end edge 42 of the feedplate. Consequently, the viscous fluid that will be in the undesirable stream form as it flows off from the feedplate's end edge 42 will be collected into the spaces between the projections 51 with those projections operating to engage with the sauce or the streams of sauce as it flows downwardly and to pull the sauce from the feedplate, thereby producing a relatively uniform flow of sauce. The sauce then is carried in the spaces between the projections as well as being carried on the surfaces of those projections around a circular path with the time period of rotation from the point of pickup to the point where the sauce will begin to be discharged from the roller enabling the sauce to even out or become more uniformly distributed as between the spaces of the projections, thereby further enhancing the uniformity of flow of the sauce. As can be best seen in FIG. 7, the sauce is initially retained by the projections, but as the projections approach a horizontal position and then subsequently revolve to a more downwardly pointed direction, the combined effects of gravity and the centrifugal force developed by the roller will cause the sauce to then be discharged from between the spaces of the projections as well as off from the surfaces of those projections. The resultant effect of this discharge action is that for a substantial portion of the arcuate path of movement of the projections, such as about 160 degrees of arcuate movement, the viscous fluid will be thrown from the roller in relatively uniform sized droplets. This discharging action effectively forms a shower of droplets that are distributed in an exceptionally uniform layer of substantially constant thickness as they are deposited onto the upper surface of the pizza P. A majority of the sauce is discharged from the roller within a first quadrant as indicated by the relative density of the lines diagrammatically indicating the droplet flowpaths. The roller is shown as rotating in the indicated direction, but the roller may be revolved in the opposite direction with the discharge pattern reversed, but without any adverse effect on the uniformity of the layer applied to the pizza shells.

It will be noted that while the distribution roller 22 has an effective length that is at least equal to the diameter of the pizza shell that is to be coated with the viscous fluid and this results in fluid being dispensed onto adjacent surface areas of the conveyor belt 14, this does not present any particular problem as the conveyor mechanism is provided with a scraper mechanism at its discharge end to remove the sauce from the surface of the belt in preparation for its return and transport of subsequent pizza shells. The scraper mechanism is not illustrated as that is a known mechanism utilized in this particular art and is known to the artisans familiar with this type of a mechanism.

Figure 8:
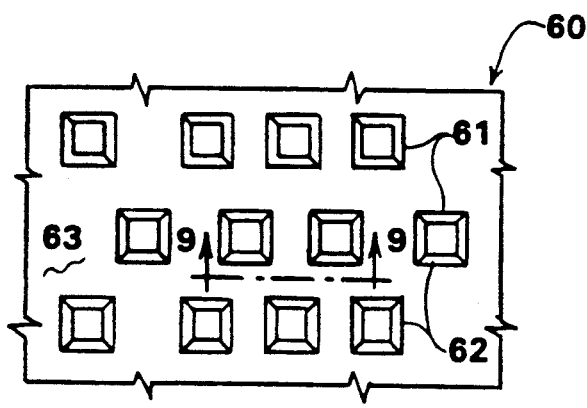
FIG. 8 is a fragmentary plan view of a modified distribution roller.
Figure 9:
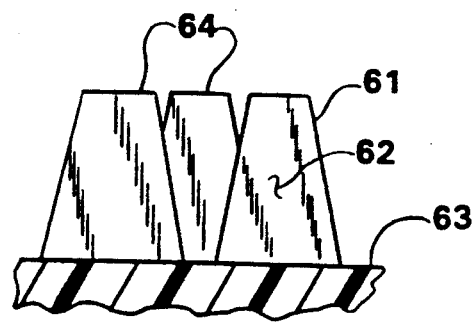
FIG. 9 is a fragmentary sectional view on an enlarged scale taken along line 9—9 of FIG. 8.

The distribution roller 22 for use in dispensing apparatus embodying this invention may be provided with projections that are otherwise configured. An example of an alternative configuration for the projections is illustrated in FIGS. 8 and 9. These figures show a fragmentary portion of a modified distribution roller 60 that is provided with projections 61 of an alternative conical configuration. These projections 61 which are also frusto-conical in shape are of a rectangular cross-section and thus have four side surfaces 62. These surfaces extend radially outward from their juncture point with the cylindrical surface 63 of the base cylinder of this modified roller to a relatively smaller outer flat end surface 64. These projections 61 having flat side surfaces have an advantage in working with viscous fluids that are less viscous than conventional types of tomato sauces. The flat surfaces facing in the direction of rotational movement have a tendency to hold a less viscous fluid on their face and to better pick up that material as it is discharged from a feedplate.

Figure 10:
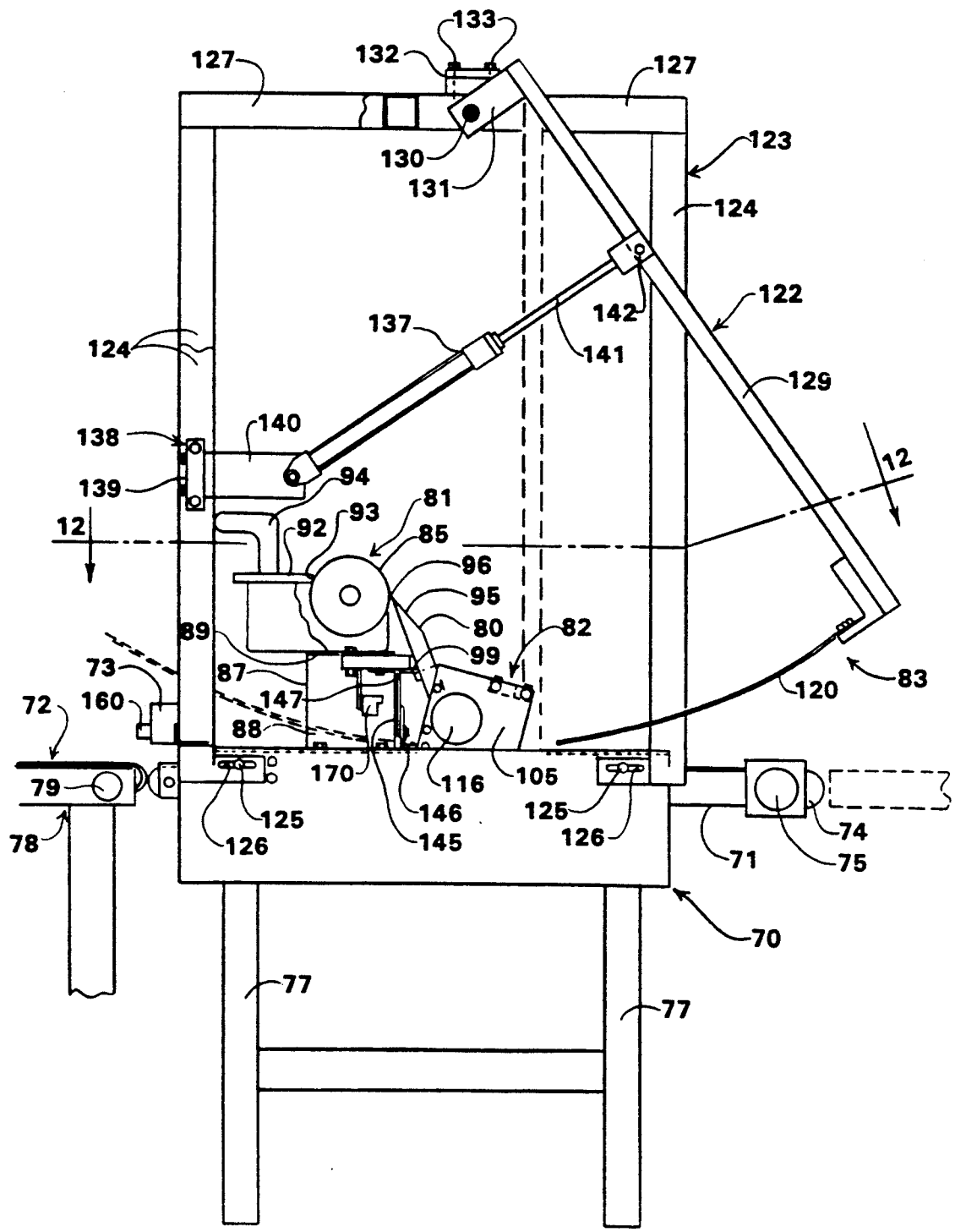
FIG. 10 is a side elevational view of a modified viscous fluid dispensing apparatus embodying this invention and which includes a masking mechanism for confining the dispensed fluid to a predetermined surface area.
Figure 11:
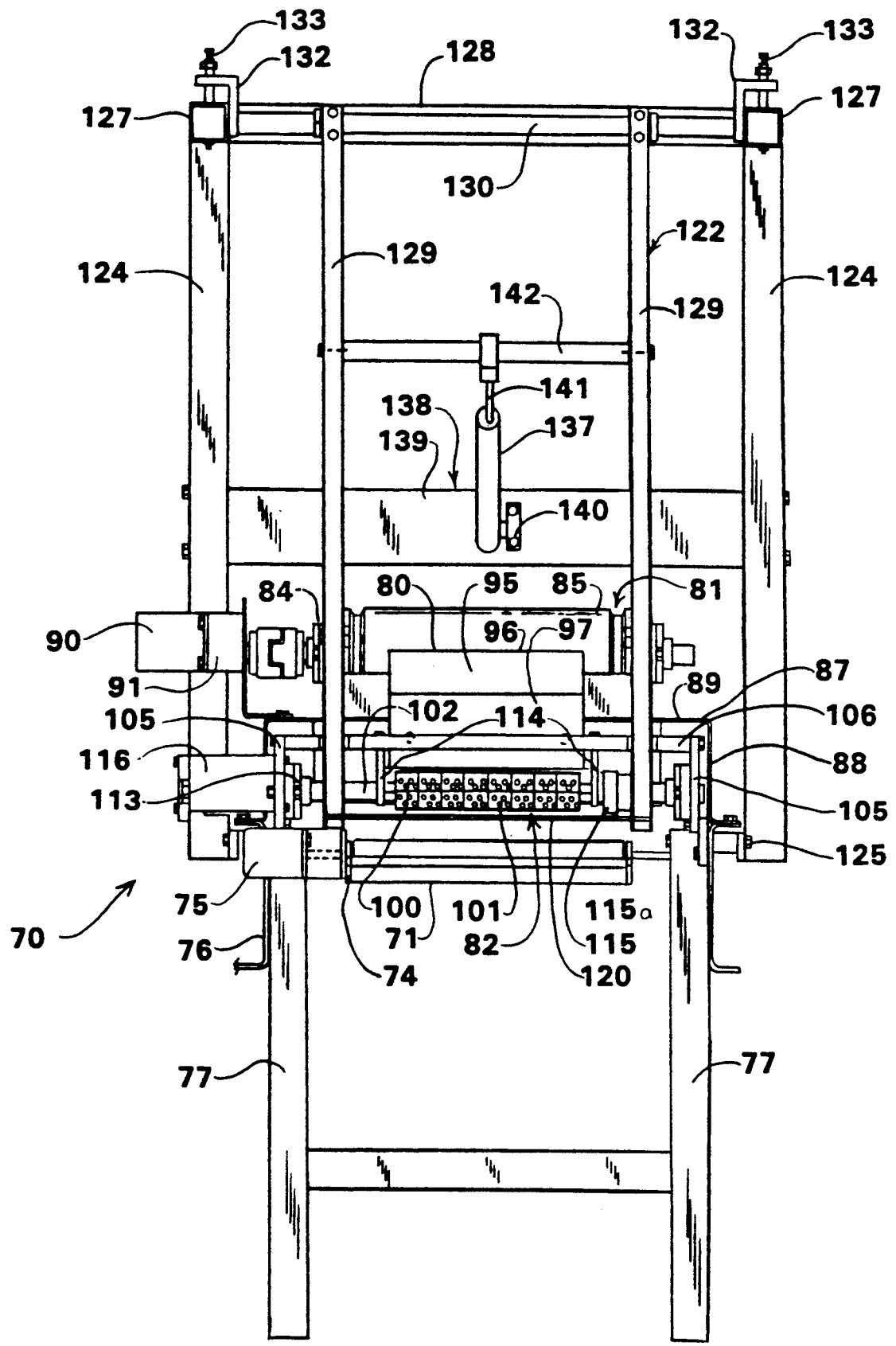
FIG. 11 is an end elevational view of the modified dispensing apparatus.
Figure 12:
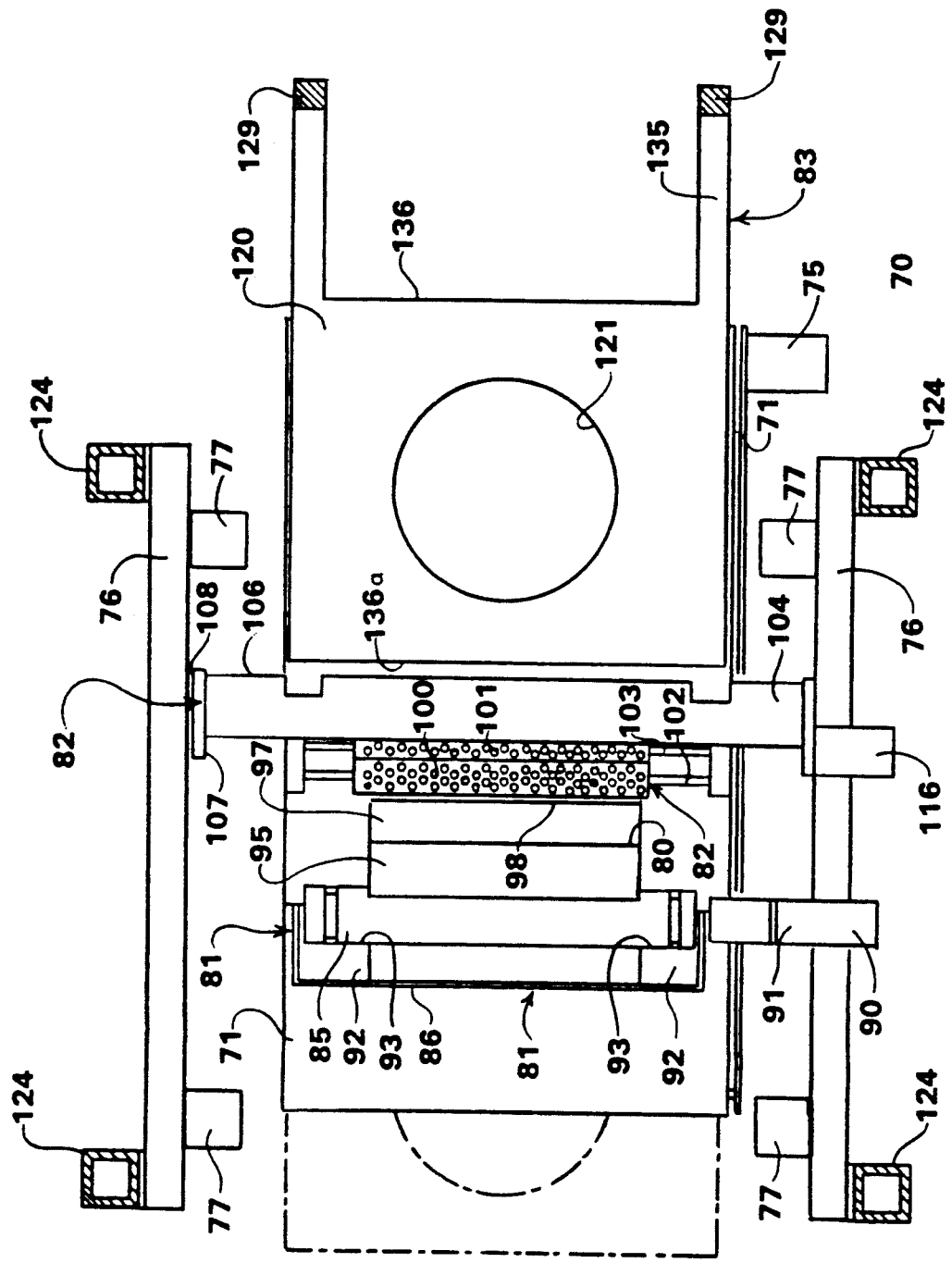
FIG. 12 is a sectional view taken along line 12—12 of FIG. 10.

A modified apparatus for dispensing of viscous fluid such as forming a layer of tomato sauce on pizza shells is illustrated in FIGS. 10-14. This modified apparatus designated generally by the numeral 70 is similar in its basic functioning and operation to the embodiment previously described and illustrated in FIGS. 1-7 and is also adapted to be mounted in superposed relationship to a belt-type conveyor 71 which is designed for transporting of pizza shells through the area where a coating of the viscous fluid is applied by the apparatus to the shells. The conveyor 71 is shown as being of a relatively short length such that it only extends longitudinally to an extent sufficient for transport of the pizza shells through the fluid application zone. It will be understood that the apparatus would be associated with other conveyor systems such as a discharge conveyor which would be located at the right side of FIG. 10 and form a continuation of the conveyor 71. Its purpose would be to continue displacement of the pizza shells once they have been coated with the fluid to either a subsequent operating station or to other transport means. Similarly, an infeed conveyor would also be provided and located at the left side of the conveyor 71 as seen in FIG. 10 to effect infeed of the pizza shells into and onto the conveyor 71 for application of the viscous fluid. A short portion of this infeed conveyor designated generally by the numeral 72 is shown in FIG. 10 and 12 for the purpose of illustrating a component that is incorporated into the system of the modified fluid dispensing apparatus. As will become apparent with further detailed description of the specifics of the structure and operation, this infeed conveyor includes appropriate sensing devices 73 for detecting the approach of a pizza shell and provides a control signal to other components of the system to effect the desired timed operation of certain components. A detector mechanism indicated generally by the numeral 73 may be of a photosensing type that is positioned in association with the infeed conveyor to respond to the leading end edge of the pizza shell and to generate an electrical control signal that is input into the control system. As in the case of the first described embodiment, the conveyor 71 includes a belt of predetermined width that is sufficient to accommodate the largest size pizza shell to be coated with the fluid and that belt is trained around a pair of rollers 74 that provide support of the belt with an upper run lying in a substantially horizontal plane. One of the rollers is mechanically coupled with a drive motor 75 which may be of an electrical type and mechanically coupled to the roller by a gear reduction mechanism to result in revolution of the conveyor belt at a predetermined speed. The conveyor rollers 74, as well as the drive motor, are mounted on a pair of elongated, spaced apart rails 76 that are mounted on a set of vertically disposed legs 77 that are of a length to maintain the conveyor 71 at a desired elevation convenient for operation of the apparatus by the personnel who are monitoring its operation. The infeed conveyor 72 is also supported on its own structural framework with portions thereof designated by the numeral 78 and the revolving belt is powered by its own independent drive motor 79. That drive motor is also advantageously provided with a gear reduction mechanism designed to result in the infeed conveyor displacing the pizza shells at the same horizontal velocity as the conveyor 71 during transport of the shells through the fluid application zone.

The basic components of this modified dispensing apparatus are similar in structure and operation to those of the first described embodiment. Those components include an inclined feed plate 80, a fluid applicator 81 for placing viscous fluid onto the feedplate, and a fluid-distribution roller system 82 for transferring the fluid from the feedplate onto a pizza shell P. As will become readily apparent, the fluid distribution roller system 82 differs substantially from the single roller system previously described, although its basic function remains essentially the same. This modified dispensing apparatus, however, does include in its combined structure one other additional component which materially aids in obtaining a desired application of the fluid to a specified area. This additional component is generally described as a mask mechanism indicated generally by the numeral 83 and has as its purpose the confinement of the pattern of distribution of the viscous fluid to a predetermined surface area, specifically, the general area of the upper surface of a pizza shell P.

The fluid applicator 81 is similar in structure and function to that same component as the first described embodiment. It includes an elongated pickup cylinder 83 which is supported for revolution about a horizontal axis and partially immersed within the fluid that is contained within a reservoir or open top tank 86. A pair of bearings 87 are secured to opposite transverse ends of the elongated tank 86 with the end portions of the axle of the cylinder 85 being journalled and supported in those bearings. A U-shaped support bracket 87 having vertically extending legs 88 secured to the conveyor support rails 76 carries a transversely extending support plate 89 that extends transversely across the apparatus and carries the tank 86 which is bolted to the upper surface of that support plate. Revolution of the cylinder 85 is effected by an electric motor 90 which is mechanically supported on the tank and operatively coupled with an axial extension of the cylinder's axle. This mechanical interconnection is effected by a speed reduction mechanism 91 to result in operation of the cylinder at a desired speed that is appropriate for effecting pickup of the fluid from the tank and its deposit onto the feedplate 80.

In this modified apparatus, it is preferred that the effective axial length of the pickup cylinder 85 be limited to a transverse extent that is substantially equal to the width or transverse dimension of the area that is to be coated with the viscous fluid. Accordingly, this modified apparatus includes a pair of scraper plates 92 that are mounted on and supported by a rear wall of the tank 86 and extend toward the cylinder with an end edge 93 thereof disposed in contacting engagement with the surface of that cylinder. These scraper plates 92 are laterally spaced apart and are of a transverse width to remove the fluid that may be picked up by the surface of the cylinder in laterally outward relationship to the desired transverse width of fluid to be dispensed. Provision is made for adjusting the lateral spacing of the two scraper plates 92 either relatively inward toward each other or outwardly to either reduce or increase the effective axial length of the pickup cylinder. Since the operating width for an apparatus such as for applying fluid to pizza shells is of predetermined extent as pizza shells have standard diameters, the means for adjustment may be in the form of spaced holes that are threaded to receive the attachment bolts and thus readily permit the scraper plates to be mounted in different positions.

Feeding of viscous fluid into the tank 86 may be effected by a pressurized system that is connected to an inlet duct connected with the tank. This inlet duct 94 is advantageously supplied through a duct (not shown) that, in turn, is supplied by a pump system communicating with a supply of the viscous fluid, all of which are not shown in the drawings as those components and their operation are well-known to those having ordinary skill in this art.

The inclined feedplate 80 has a same general structural configuration as that described with the first illustrated embodiment of the invention. It comprises a flat plate having a transverse width which corresponds to the transverse width of viscous fluid that is to be deposited on the pizza shells. It is formed with a compound upper surface over which the fluid flows that includes a first or upper surface portion 95 that terminates in an upper transverse edge 96 adapted to extend into contacting engagement with the surface of the cylinder 85 to effect scraping or removal of the fluid from the surface of that cylinder. This upper surface portion 95 joins with a lower surface portion 97 that terminates in a lower transverse edge 98 which can be seen in FIG. 14. Support of the feedplate in a steeply inclined position is provided by a mounting bracket 99 that is of an L-shaped configuration having a horizontal leg that is secured to the support plate 89 on which the tank 86 is positioned. A second leg of the bracket 99 is mechanically secured to a rear surface of the feedplate 80 and is adapted to be removable for purposes of facilitating cleaning. The feedplate also has the lower portion formed with a reverse face 97a disposed in angled relationship to the upper surface portion 97 resulting in a relatively sharp transverse edge 98 that enhances discharge of the fluid.

Figure 13:
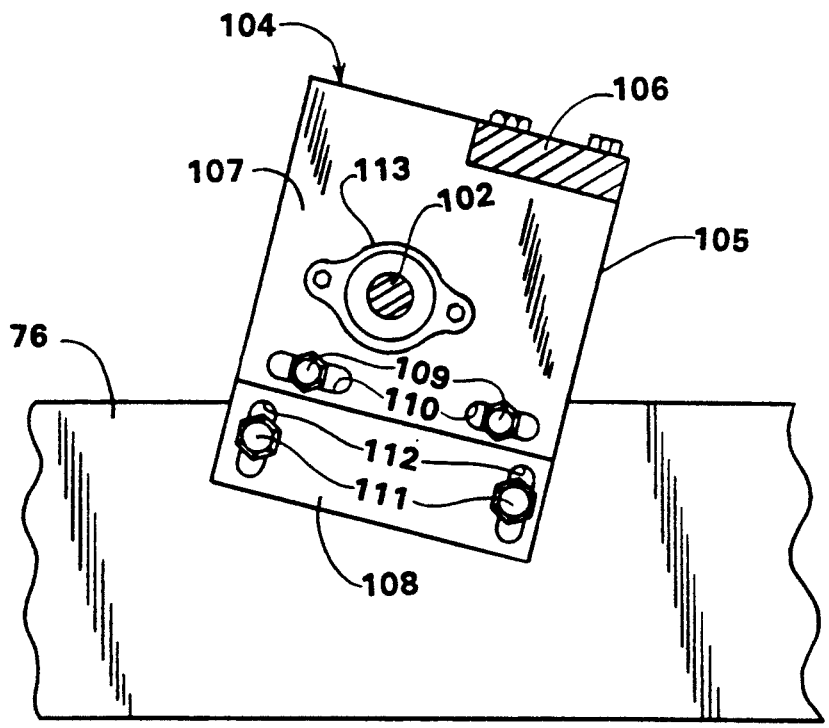
FIG. 13 is a fragmentary sectional view on an enlarged scale taken along line 13—13 of FIG. 12.
Figure 14:
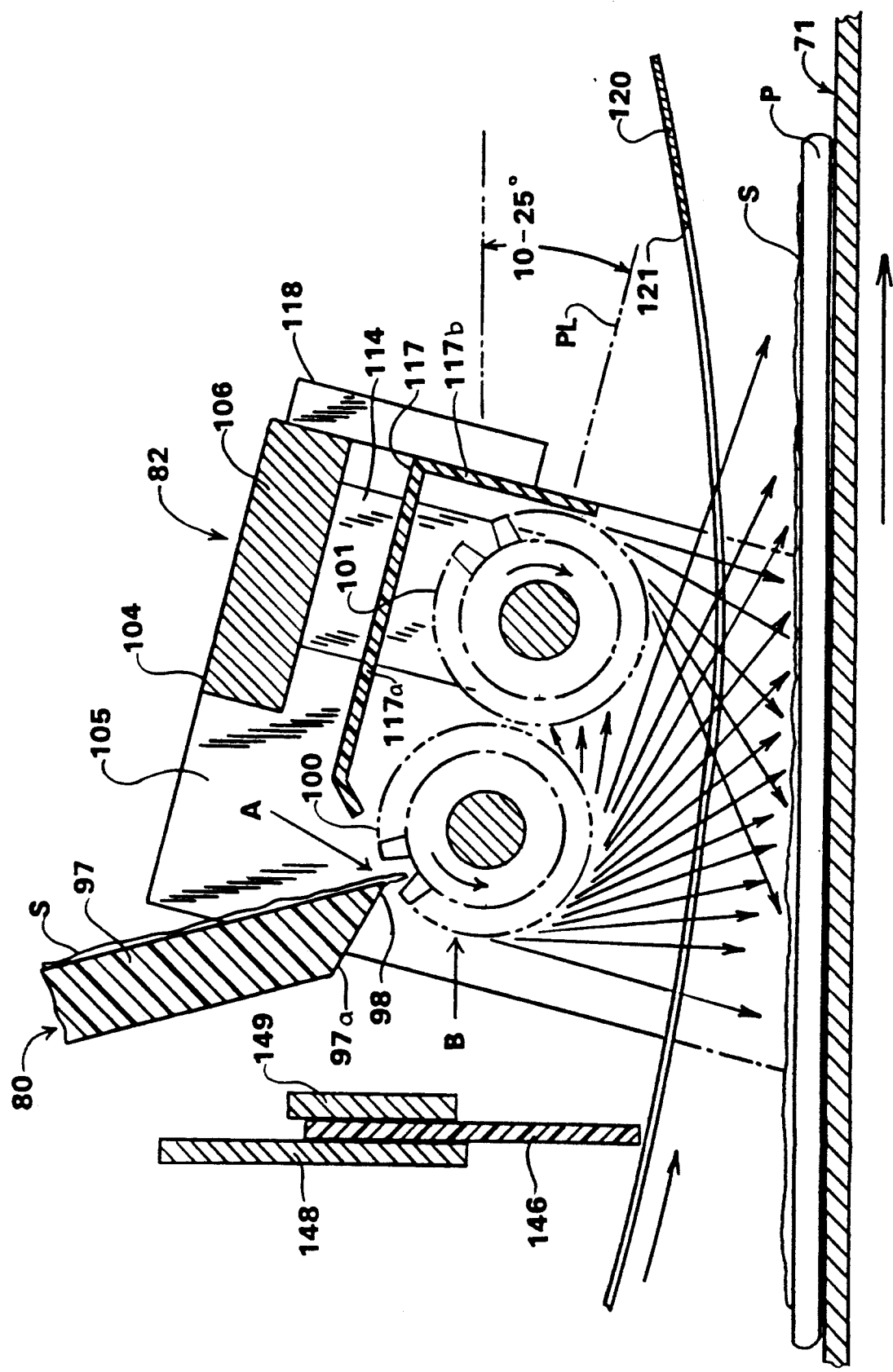
FIG. 14 is a fragmentary sectional view on an enlarged scale taken along line 14—14 of FIG. 12.

The fluid distribution roller system 82 is designed to perform the general function of removing the fluid that is flowing from the end edge 98 of the feedplate and to deposit that fluid in the form of small droplets that are showered onto the upper surface of the pizza in the same general manner as the distribution roller of the first described embodiment. However, in the distribution roller system of this embodiment, two identical rollers, 100 and 101, are provided as can be seen in FIG. 14 with each of those rollers being identical in construction as to the operative portions thereof and having an exterior surface formed with a number of rows of a plurality of conical projections that extend radially outward and may be of the same configuration as that specifically described in association with the first illustrative embodiment. These rollers 100 and 101 are mounted on respective elongated axles 102 and 103 and which are carried on a support frame 104. This support frame 104 includes a pair of end support plates 105 that are mechanically interconnected into a rigid unitary structure by a transverse bar 106. Each of the end supports 105, one of which is shown in detail in FIG. 13, is secured to a respective one of the support rails 76. These end supports 105 are designed to enable the distribution roller system 82 to be selectively positioned as deemed appropriate for a particular application function.

Accordingly, these end support plates include a primary plate 107 that is rigidly secured to the transverse bar 106 and a secondary plate 108 which provides for the selective adjustment. The secondary plate 108 is secured to the primary plate by means of clamp bolts 109 threaded into the secondary plate and extending through respective elongated slots 110 formed in a lower marginal end portion of the primary plate and oriented to permit adjustment in a generally horizontal plane with respect to the support rails. Attachment of the secondary plate to an inner face of a respective support rail 76 is effected by a similar clamp mechanism including a pair of clamp bolts 111 that mechanically interengage with the vertical flange of the support rail and extend through respective elongated slots 112 formed in the secondary plate 108 and oriented to extend in a generally vertical direction. This attachment of the secondary plate to the support rails enables the support frame 104 to be angularly adjusted about a horizontal transverse axis for purposes that will be subsequently explained.

The axle 102 of the first roller 100 is journalled in bearings 113 that are carried on the primary plates 107 of the support frame. The axle 103 of the second roller 101 is journalled in bearings carried by a pair of hanger brackets 114 that are secured to the transverse bar 106 and extend in a relatively downward direction. One end of the axle 103 extends a distance relatively outward of the one hanger bracket 114 and carries a gear 115 that meshes with a similar gear 115a mounted on the axle 102 and thus effects concurrent driving of the second roller in association with the first roller and, with the gears being of the same size, cause rotation at the same speed. Driving of the rollers 100 and 101 is effected by a hydraulic drive motor 116 which is mounted on one end support 105 of the support frame. It is mechanically coupled to the axle 102 and designed to be controllably operated to drive the rollers at a selected speed such as between 400 and 700 rpm. A suitable hydraulic power system is provided, although not shown and described, and illustrated in further detail as such is well-known to those having ordinary skill in this art, and connected to the motor 116.

Each of the rollers 100 and 101, as previously noted, is of the same size and in view of the geared interconnection, these rollers are revolved in opposite directions. As can be best seen in FIG. 14, the first roller 100 is driven in a counterclockwise direction as seen in that drawing figure with the pizza shells P approaching in a direction toward the first roller, the second roller 101 being driven in a clockwise direction. The two rollers are supported on the frame 104 to have the peripheral surfaces as defined by the ends of the respective projections revolved in relatively close proximity. An L-shaped shield 117 is positioned in covering relationship, primarily to the second roller 101. It is secured to the support frame 104 by a pair of mounting plates 118 that are bolted to the transverse bar 106 and carry the shield 117 at their lower ends. This shield has a horizontal leg 117a that extends in overlying relationship to the second roller 101 and a vertical leg 117b that extends a distance downwardly in closely spaced relationship to the roller at its outwardly facing peripheral surface. This shield has as its primary function the purpose of minimizing the throwing of the viscous fluid in a direction either vertically upward or horizontally outward from the roller system.

This embodiment of the invention includes the mask mechanism 83 having the function of confining the showering of droplets of the viscous fluid to a predetermined surface area of a pizza shell and which performs advantageously with the distribution roller system 82. One objective of this mechanism is to restrict the application of the viscous fluid to an area that is slightly less than the maximum extent of the shell and thus result in a peripheral border that will not have the fluid applied thereto. This technique results in a pizza shell that is better adapted to a baking operation as is necessary for consumption as it leaves a narrow ring of uncoated surface that tends to reduce the effect of overheating that otherwise occurs where the fluid extends completely to the outer periphery of the shell. In addition to that functional advantage, it also enhances the appearance of the completed pizza. Accordingly, the mask mechanism includes a mask plate 120 that is of a generally rectangular configuration in plan view (see FIG. 12) and is formed in this basic embodiment with a central circular aperture 121 that is slightly smaller in diameter than that of the pizza shell which is to be processed by the apparatus. It is of a diameter such that a peripheral border of the order of 10 mm radial width is provided.

This mask plate 120 is mounted on a pendulum-type support 122 to effect its displacement in coordination and association with a pizza shell being transported on the conveyor 71. A frame structure 123 is adapted to be mounted on the support rails 76 and extends vertically upward therefrom to provide a means for mounting of the pendulum-type support mechanism 122 and its associated mask plate for swinging displacement in closely adjacent, but vertically spaced relationship above a pizza shell. This frame structure 123 includes four vertical support legs 124 that are each mechanically connected to a respective one of the support rails 76 by a clamp bolt 125 which extends through a slot 126 and thus enables adjustment of the frame structure longitudinally of the support rails and other components that are mounted thereon to enable proper alignment of the mask with respect to the fluid distribution roller system 82. Horizontal frame elements 127 and 128 are provided at the upper ends of the legs 124 and are rigidly secured thereto resulting in formation of a rigid frame structure. The pendulum-type support mechanism 122 includes a pair of elongated arms 129 that are pivotally interconnected with a support shaft 130 extending between the opposed longitudinally extending frame elements 127. An opposite lower end of the arms 129 is mechanically secured to the mask plate 120. A laterally offsetting arm 131 is connected to the upper end of each of the arms 129 to effect its interconnection with the shaft 130 for the purpose of offsetting the arm 129 to a sufficient extent that adequate clearance is obtained with respect to the roller system 82, but to place the mask plate at a preferred position for its operation. An adjustment mounting mechanism 132 is also provided for mounting of the support shaft 130 on the frame elements 127. This mechanism comprises L-shaped brackets to which the shaft is secured and is provided with adjustment bolts 133 that interconnect with the respective frame elements 127 and are operable to effect adjustment of the brackets in a vertical direction and to thus also effect a vertical height adjustment of the mask plate 120 to obtain the desired spacing between the plate and the pizza shells.

The mask plate 120 is formed with an arcuate shape as can be best seen in FIG. 10 with its radius of curvature being that of the elongated arms 129 of the pendulum support mechanism 122. This results in the mask plate following an arcuate path of movement which maintains the plate at the point underlying the roller system 82 at a constant elevation. A pair of attachment arms 135 are integrally formed with the mask plate 120 at its one end and project a predetermined distance from an end edge 136 of the plate. This configuration also aids in providing the necessary clearance for operation of the mask plate with respect to the roller system 82. These attachment arms 135 extend into mounting relationship to the lower end portion of the arms 129 and are secured thereto by bolts. Thus the mask plate 120, which is of a structurally rigid construction and supported in a cantilevered manner with respect to the arms, can move freely through the space underlying the roller system 82. The fluid tank 86 is supported at an elevation which places it above the path of movement of the mask plate. While the mask plate 120 is in its "at rest" position as shown at the left side of FIG. 10, the distribution roller system 82 continues to operate and applies the fluid to the conveyor 71 as the sauce is thrown through the space defined by the attachment arms 135 and end edge 136 of the mask plate. It will be noted that the apparatus can be adapted to function with different sized or different configured pizza shells, or other element to be coated with the fluid, by substituting a mask plate having an appropriately sized aperture (or apertures) configuration as the plates are of a construction to be removable and interchangeable.

Actuation of the pendulum-type support mechanism 122 is effected by a hydraulic cylinder and piston assembly 137. One end of the cylinder is pivotally secured to a mounting bracket 138. This mounting bracket includes a transversely extending base plate 139 that is secured to the opposed vertical support legs 124 at one end of the frame structure 123 and a forwardly projecting leg 140.

A piston rod 141 extendible from the opposite end of the cylinder is pivotally connected to the elongated arms 129 by a transversely extending connecting shaft 142 fixed to the arms. A hydraulic fluid power source is interconnected with the cylinder and piston assembly 137 and is operable in timed relationship to other components of the mechanism to cause swinging movement of the mask plate 120 through its arcuate extent of travel. The extent of travel is shown in FIGS. 10 and 12 with the mask plate shown in broken lines at the left side of both drawing figures in its "at rest" position and in full lines at the position attained after completing a swing in applying a coating of fluid to a pizza shell. In its "at rest" position, the end edge 136 of the mask plate is located to the left of the distribution roller system and the zone in which it throws the fluid.

Viscous fluid is continuously dispensed and thus will coat upper surface portions of the mask plate 120 during the time that this plate traverses the dispensing area during both the application stroke and the return stroke. It is advantageous that the fluid be removed from the upper surface of the mask plate for each pass over the dispensing area to better assure uniformity in thickness of the coating applied to the shells.

Accordingly, this embodiment of the invention includes a scraper mechanism 145 which is positioned to have a scraper element 146 operate in frictional engagement against the upper surface of the mask plate. This scraper mechanism 145 includes a bracket assembly 147 which is secured to the underside of the fluid tank 86 to support the scraper element at a position which is in preceding relationship to the roller assembly 82. The bracket assembly includes an L-shaped plate 148 having an upper horizontally extending leg adapted to be attached to the underside of the tank with the other leg projecting vertically downward and carrying the scraper element at its lower end. The scraper element 146 which is formed from a resilient material such as either a plastic or rubber-like material is of an elongated strip form and is secured to the vertical leg of the L-shaped plate 148 by an elongated clamp plate 149 that in turn is attached to the lower end of the vertical leg. Attachment of the clamp plate and scraper element is effected by clamp bolts which operate in slots to permit vertical adjustment of the bottom or lower edge of the scraper element to a position where it makes appropriate frictional engagement with the upper surface of the mask plate 120. Operation of the scraper mechanism 145 can be best understood by reference to FIG. 14. From that figure, it will be seen that the swinging movement of the mask plate along its arcuate path will result in the scraper element 146 riding along the plate's upper surface and scraping the fluid that is deposited thereon in a direction to either fall through the aperture 121 or to fall over the end edge 136 of the mask plate. The fluid thus removed drops onto the upper surface of the conveyor belt 71 at a point which is intermediate any two adjacently disposed pizza shells, namely the one that has just been coated and the next following shell. The fluid thus deposited, along with the fluid continuing to be discharged from the distribution roller system 82, will ultimately be removed from the belt after it reaches a point which may be at the underside or the lower run of the belt immediately after it turns over the exit end roller of the conveyor. This secondary fluid removal means is not illustrated as such a device is well-known and is commonly utilized with conveyor mechanisms of this nature and intended for this purpose.

Figure 15:
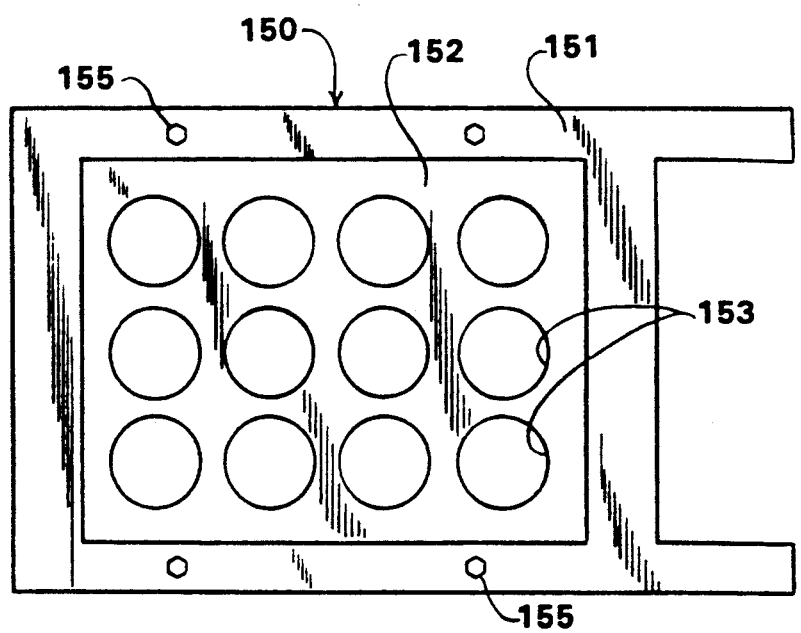
FIG. 15 is a top plan view of a modified mask.
Figure 16:
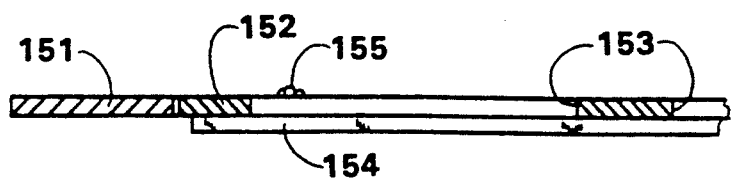
FIG. 16 is a fragmentary sectional view on an enlarged scale taken along line 16—16 of FIG. 15.

A modified mask plate 150 is illustrated in FIGS. 15 and 16.

This modified mask plate is designed to facilitate interchange of components so as to adapt the apparatus to different size or configured elements that are to be coated with a viscous fluid. In this modification, the mask plate is shown as being of a design which enables a plurality of circular shaped elements to be coated with the fluid during one swinging movement of the mask plate. This plate includes a base support plate 151 and a removable apertured plate 152. The apertured plate is formed with a number of circular apertures 153 that are arranged in a predetermined pattern which is designed to coincide with the arrangement of the same number of small size pizza shells or other elements to be coated with the viscous fluid and which will be transported as a composite unit on the conveyor 71. This permits the capacity of the apparatus to be substantially increased for use with the smaller size units which, in the case of pizza shells, may be in the range of 130 to 180 mm in diameter. The base support plate 151 is formed with a rectangular opening and has longitudinally extending support flanges formed adjacent each of the longitudinal side edges. These support flanges 154 are shown as being disposed in a plane parallel to the upper major part of the base support plate, but displaced a distance downwardly to form a recess that is of substantially the same thickness as the apertured plate 152 to be fitted into that opening. This results in the upper surface of the apertured plate being coincident with the upper surface of the base plate and thus be better adapted to operation of the scraper mechanism in removing fluid accumulated thereon during the return stroke of the mask plate. To assure that the apertured plate 152 remains in position, clamp screws 155 may be provided as shown in FIGS. 15 and 16.

Functioning of the distribution roller system 82 can be best understood by reference to FIG. 14. FIG. 14 is diagrammatic in most respects and includes diagrammatic flowpaths for the fluid as it is removed from the feedplate 80 and then thrown onto the upper surface of the mask plate and the pizza shells that are travelling through the application zone underlying the roller system. The fluid, as in the case with the first described embodiment, flows downwardly over the upper and lower surface portions 95 and 97 of the feedplate in a relatively uniform thickness layer toward the bottom or lower transverse edge 98 where it will then continue flowing downwardly and into engagement with the first roller 100. The fluid, as it exits from the edge 98, will tend to form into streams that are undesirable as previously explained. Those streams of fluid are engaged by the projections on the roller 100 which effectively pulls the fluid from the discharge end edge 98 and carries it around in a circular path. As a consequence of centrifugal and gravitational forces, the fluid will then subsequently be thrown from the roller in relatively small droplet form and applied to the upper surface of a pizza shell as well as to portions of the mask plate 120. A majority of the fluid carried by the roller 100 (about 90%) will be dispensed and thrown in a downward direction as is diagrammatically illustrated by line-type flowpaths, although portions will be further carried by the roller and thrown along paths that are more horizontally oriented and in a direction which is along the path of movement of the pizza shell. With rollers that are 55 mm in diameter, it has been found that a rotation speed of 400 to 700 rpm results in good performance with the higher speeds tending to confine the dispensed fluid to a smaller band. Most of the fluid then remaining on the first roller 100 will be thrown against the second roller 101. Fluid thrown against the second roller will be carried by that roller around a circular path and will then ultimately also be thrown downwardly as a consequence of the combined effects of centrifugal force and gravity toward the pizza shell and mask plate. The general path of movement of the fluid that is thrown from the second roller is also diagrammatically illustrated by line-type flowpaths.

Functioning of the L-shaped shield 117 can also be best seen in FIG. 14 and it will be noted that it will tend to confine the fluid in close proximity to the rollers even though there may be some tendency for the rollers to throw fluid in an upward direction. Even though fluid may be thrown against the inner faces of the shield, it is immaterial that some may be caught and retained as any build-up of material in this region will merely cause subsequent fluid carried by the second roller to be retained in association with the roller and carried around to a dispensing position. It is advantageous that the vertical leg 117b of the shield be disposed in close proximity to the outer periphery of the second roller to better assure that the fluid will be carried to a position where it will be thrown in a downward direction. It is desirable to have the inner face of the shield's vertical leg 117b to be in contact with the outer ends of the projections on the second roller 101 as that will tend to eliminate dripping of sauce from the shield. It can be seen from FIG. 14 that this dual roller dispenser does provide the advantage of confining the distribution of the sauce to an application zone of limited extent with respect to the path of movement of the pizza shells as compared to the distribution pattern of the single roller dispenser as shown in the diagrammatic illustration of FIG. 7.

Control can be obtained as to the application zone's location for the dual roller system by appropriate adjustment of the pick-up point of the first roller 100 with respect to the lower edge 98 of the feedplate as well as the angular position of the two rollers and their vertical spacing with respect to the pizza shell. It will be noted in FIG. 14 that the two rollers are shown having a common plane PL extending through their axes disposed at an angle with respect to a horizontal plane. This specific arrangement places the second roller 101 at a relatively lower elevation. Such an arrangement is advantageous in that the second roller is then more effective as to intercepting fluid thrown from the first roller 100 in a downstream relationship and prevent its throwing the fluid to any substantial distance. It will also be noted that the first roller is positioned with its periphery being in proximity to the lower edge 98 of the feedplate at a point which is angularly displaced approximately 30 degrees from a vertical axis through that first roller. The functioning of the support frame 104 is to enable the location of the first roller with respect to the feedplate to be selectively adjusted as well as enabling adjustment of the angular relationship of the two rollers with respect to a horizontal plane. That adjustment, as was previously indicated, is effected by means of the clamp bolts 109 and 111 functioning in the related slots 110 and 112 of the primary and secondary plates 107 and 108. That functioning can be best understood by reference to FIG. 13. By combined adjustment, it is possible to locate the rollers such that the edge 98 may be disposed at a greater than 30 degree angle with respect to a vertical axis extending through the first roller. The adjustment mechanism is designed in the illustrative embodiment to permit that point of engagement to be adjusted between the 30 degree point of engagement and a point which is displaced 45 degrees or being at an angle of 75 degrees with respect to the vertical axis. These maximum extents of displacement or positioning of the edge 98 are indicated at points A and B with respect to the roller 100 as shown in FIG. 14. Concurrently with effecting adjustment of the point of contact of the edge 98, the support frame 104 may be positioned so as to effect appropriate angling of the common plane PL of the two rollers with the adjustment being optimally limited to a range of 10 to 25 degrees below a horizontal plane. The effect of adjusting the positions and angular relationships is to obtain dispersement of the fluid within a desired range and to advantageously concentrate the dispersement to a relatively short longitudinal extent. This better assures that a uniform thickness coating will be achieved by the apparatus. The dual roller system also is of particular advantage with respect to the combination with a mask plate. However, it will be understood that the dual roller system may also be utilized independently of an apparatus having the mask plate.

Use of 55 mm rollers 100, 101 is advantageous as the dispensing band or application zone is confined to a convenient dimension. Although larger diameter rollers can be used in this modified apparatus, such as up to 150 mm diameter, use of the larger size rollers will result in a decrease in operating capacity of the apparatus. This decrease results from the larger diameter rollers requiring that there be a relatively greater spacing between adjacent shells.

Figure 17:
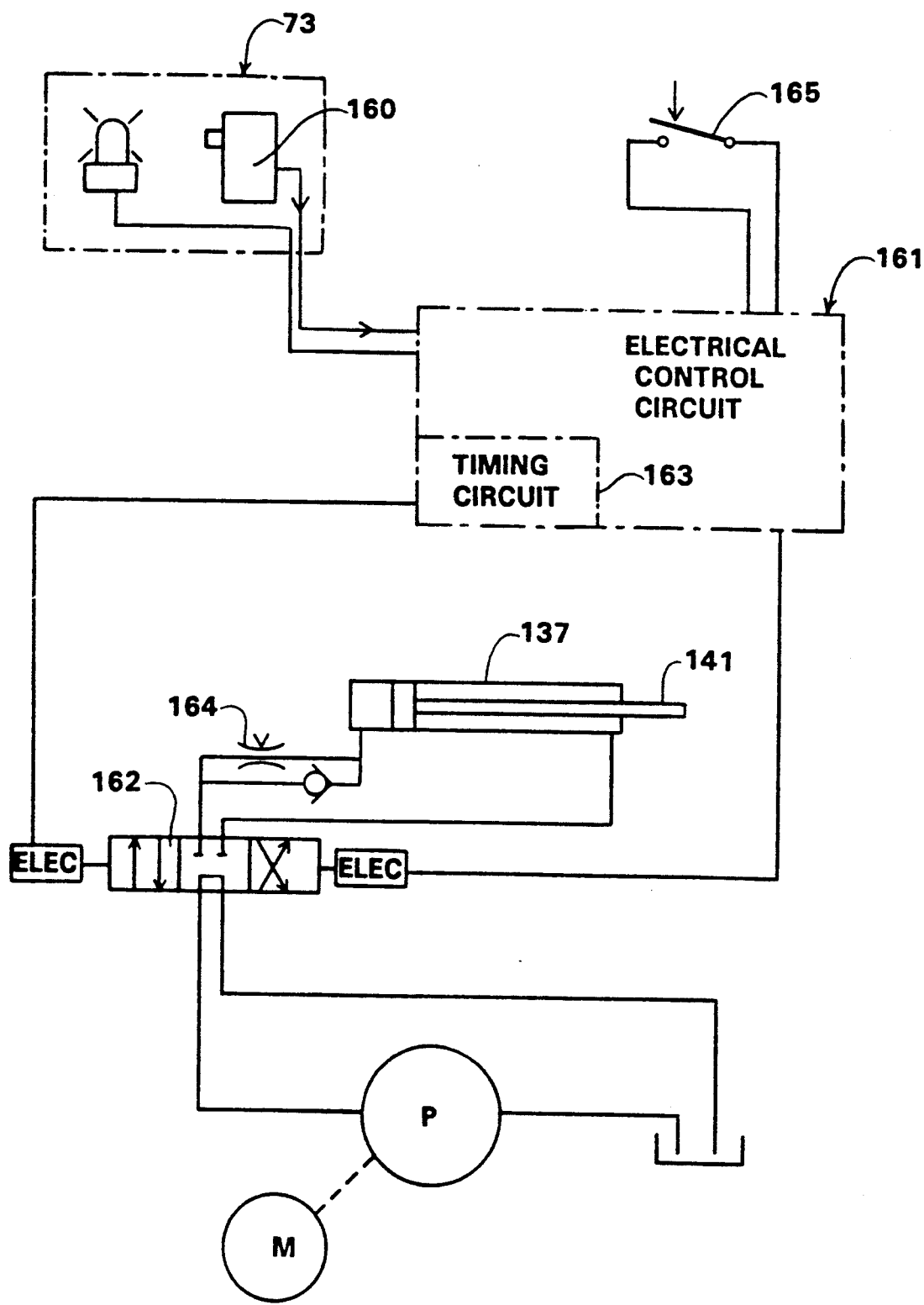
FIG. 17 is a schematic diagram of the electrical control circuit and hydraulic system for the modified apparatus.

Control of operation of the mask mechanism 83 is effected by the detector mechanism 73 which synchronizes movement of the mask plate 120 with movement of the pizza shells through the sauce application zone. An electrical and hydraulic control system is schematically illustrated in FIG. 17 for demonstrating the cooperative functioning of the various components of the modified apparatus 70. As the shells are transported on the infeed conveyor 72 to the modified apparatus 70, they are detected by a photo-sensor element 160 which responds to a shell's leading edge as it passes the sensor's position and generates an electrical signal that is input into the system's electrical control circuit 161. That circuit is interconnected with the hydraulic system which includes a control valve 162 connected in the hydraulic circuit and is coupled with the hydraulic cylinder and piston assembly 137. A timing circuit 163 in the electrical circuit delays functioning of the mask mechanism for a time period after input of the photo-sensor's signal to permit movement of the pizza shell onto the conveyor 71 and displacement to a position in alignment with the mask plate's aperture 121 with the mask plate at an "at rest" or base position at the broken line position in FIG. 12. The electrical circuit then functions to send an operating signal to the valve 162 actuating it to a position resulting in pressurized hydraulic fluid being applied to the cylinder and piston assembly causing the piston rod 141 to extend and swing the arms 129 in a direction to cause the mask plate 120 to move in synchronism with the underlying pizza shell. A flow control valve 164 in the fluid circuit to the cylinder is adjusted and set to regulate the speed of extension of the piston rod 141 and thereby control the mask plate's movement to stay in alignment with the pizza shell which is travelling on the conveyor 71. That conveyor is moving at a preset speed in accordance with the design parameters of its drive motor 75 and speed reduction mechanism. When the mask plate reaches its furthest extent of travel after completion of application of a coating of sauce, an electrical switch 165 detects the plate's position and operates to input a signal to the electrical circuit 161 to actuate the valve to a position that reverses the flow of hydraulic fluid to the cylinder and piston assembly. This causes the piston rod to retract and return the mask plate to its "at rest" position in preparation for the next pizza shell. The return of the mask plate is at a maximum speed practical for the apparatus to minimize the return time and thereby reduce the spacing between pizza shells and maximize the capacity of the apparatus. Further specifics of the electrical control circuit and the hydraulic system as well as the operation and functioning of the components are not described in more detail as they are well-known to those with ordinary skill in this art.

Both the fluid applicator 81 and the fluid distribution roller system 82 operate continuously once the apparatus 70 has been placed in operation. Consequently, these components in this modified apparatus function to continuously dispense a stream of sauce. During the time that the mask plate 120 is maintained in its "at rest" or base position, the position shown in broken lines in FIG. 12, the sauce will be deposited onto the conveyor 71 at a point that is between the pizza shell that has last been coated and the next following shell. The open space defined by the arms 135 and end edge 136 of the mask plate 120 is at that time positioned in underlying relationship to the roller system 82. Similarly, while the mask plate is returning to its base position from a sauce application operation, sauce will be dispensed through the aperture 121 and onto the conveyor 71 at the space between adjacent pizza shells. Sauce that has been intercepted by the mask plate during an application stroke as well as during a return stroke is removed by the scraper mechanism 145 and either falls through the aperture 121 or off the end edge 136. The mask plate is preferably of a width such that the transverse axial length of the distribution rollers 100 and 101 is slightly less than the transverse spacing between the inwardly facing edges of the mask plate's attachment arms 135. With that dimensioning, the scraper mechanism is enabled to remove all of the sauce that is intercepted by the mask plate and retained on its upper surface.

It will be noted that tomato sauces as a consequence of their viscosity characteristic will tend to cling to the vertical edges of the mask plate's aperture 121 and end edge 136 as well as the opposite edge 136a. Sauce clinging to those edges may intermittently drop and if it should drop onto a pizza shell, may either adversely affect the uniformity of the sauce applied or fall onto the border area intended to be kept free of sauce. To minimize, if not eliminate, this adverse effect, the modified apparatus may include a device known in this art as an "air knife". An air knife 170 is shown in FIG. 10 positioned adjacent to the scraper mechanism 145 to direct a curtain of air in a downward direction against the mask plate. The curtain of air developed by the air knife, which is of a length to extend substantially across the mask plate, is of a volume and velocity effective in blowing off the sauce that may remain on the vertical edges of the mask plate's aperture 121 and the end edges 136 and 136a after operation of the scraper element 146. The air knife is mounted on the underside of the sauce reservoir's support bracket 87 and is connected to a suitable source of pressurized air having appropriate control components to enable control of the air curtain that is developed and applied to the mask plate. The pressurized air source and its control components are not shown or described as their structure and operation are known to those skilled in this art. Similarly, the structure of an air knife suitable for this purpose is known in this art and a detailed illustration of its structure and description of its functioning is not necessary for a full understanding of this invention.

Vertical spacing of the distribution roller system 82 with respect to the upper surface of the pizza shells also has some effect on the longitudinal extent of the application zone. It has been found advantageous to maintain this vertical spacing in the range of one to two inches, preferably about one inch, and it can be seen from FIG. 14 that maintaining this small vertical spacing will decrease the extent of horizontal travel of the sauce. Maintaining of a minimal vertical spacing results in better definition of the pattern created by the mask aperture. While a certain amount of vertical adjustment in the vertical spacing can be obtained through adjustment of the support frame 104, this is of limited extent as adjustment of the frame will also result in adjustment of the relative position of the feedplate's discharge end edge 98 to the periphery of the first roller. Since the angular positioning of the feedplate 80 with respect to the roller 100 may be of prime consideration, it is best to effect vertical adjustment through vertical positioning of the conveyor 71. That conveyor is carried on the two longitudinal side rails 76 by mounting devices (not shown) which permit vertical adjustment.

The relative vertical positioning of the mask plate 120 and its radius of curvature also has effect on the dispersement of the fluid. It is best that the mask be formd with as large a radius as is practical to better assure that an uncoated border will be maintained around the entire periphery of the pizza shell. The region of particular concern is the leading edge of the shell. When the shell initially begins to traverse the application zone, the mask portion immediately following the edge 136 will intercept the fluid being thrown from the first roller 100; but, as the leading edge portion of the shell travels to the right of the rollers, then the components of the fluid traveling in a more horizontal direction will pass through the mask plate's aperture 121 and may contact the pizza shell at a point which, at that instant, may be immediately beneath the mask plate and result in the undesired coating of the border area. If the mask plate has a small radius of curvature, the fluid will be further enabled to pass through the aperture at an earlier time and will more likely contact the shell in the border area. Utilizing a mask plate of large radius of curvature. as well as having it placed closely adjacent the upper surface of the shell, better assures that components of the fluid traveling in a more horizontal direction will not be thrown under the mask and so far forward as to contact the border area of the shell. For that reason, the mask mechanism 83 in the illustrative embodiment of this invention is constructed with a mask plate support mechanism 122 having arms 129 of a length such that the mask plate has a radius of curvature of the order of 915 mm. While a larger radius of curvature, such as 1220 mm, will result in the mask plate approaching the optimum configuration of a flat plate, that size increase will necessitate a corresponding increase in the vertical height of the support mechanism as the pendulum support arms must be of a correspondingly greater length. It is mechanically feasible to construct a mask mechanism having a flat mask plate which is supported for oscillation in a horizontal plane, but the illustrated pendulum-type mechanism was deemed advantageous.

Another factor having effect on placement of the fluid and which is under the control of the mask plate is the vertical spacing of the plate above the pizza shell. The closer that the plate is to the upper surface of the shell, the better it is able to control placement of the fluid, particularly as to the leading edge portion of the shell. It is best that the mask plate be supported so that it is within the range of 6–12 mm of the shell's upper surface when at its closest point of approach. Noting that the upper surface of a pizza shell is of a wavy configuration as is natural for a pastry food product and may have undulations of the magnitude of 3 mm, 6 mm vertical spacing may be the practical minimum considering that the sauce may be applied in a layer of 1 mm or less in thickness. Pizza shells, depending upon a particular manufacturer's preference, or the style of pizza to be produced, also may be of different thickness and it is advantageous that the support mechanism 122 incorporates an adjustment mounting mechanism 132 enabling the mask plate to be vertically positioned at an optimum elevation for the particular thickness pizza shells that are being processed.

One significant advantage of the roller-type dispensing apparatus of this invention, either the single or double roller, is its capability of dispensing tomato sauce having a higher viscosity than is possible with a waterfall-only type of dispenser. Use of higher viscosity sauces enables preparation of pizza having a wider range of flavor characteristics by means of automated machines. A single roller dispenser of this invention provides satisfactory performance if a relatively heavy layer is desired and it is not deemed necessary to mask. This ability of the roller-type dispensing apparatus of this invention to work with higher viscosity sauces is not only an advantageous feature in itself, but the incorporation of rollers having a surface constructed with a plurality of the conical projections enables roller dispensing apparatus of this invention to readily accommodate variations in viscosity of the sauce that is input into the apparatus.

Having thus described this invention, what is claimed is:

1. Dispensing apparatus for placing a viscous fluid to form a uniformly distributed layer of substantially constant thickness on an upwardly facing surface of an article being displaced through the apparatus along a longitudinal path in a horizontal direction comprising:
   an elongated fluid feedplate having a longitudinal axis extending parallel to the longitudinal path of the article having an upwardly facing surface disposed in a relatively steeply inclined relationship over which viscous fluid received on said feedplate surface flows in a downward direction along the longitudinal axis of said plate in a sheet-form layer at a predetermined rate of flow, said feedplate having an upper end portion for receiving of the viscous fluid thereon and a lower end portion terminating in a transversely extending, horizontally disposed bottom end edge from which the fluid is discharged,
   fluid feed means for application of a viscous fluid in a continuous stream onto said feedplate's upper end portion in a substantially uniformly distributed layer extending transversely across a predetermined width of said feedplate, and a first elongated, fluid-distribution roller of cylindrical configuration revolved at a predetermined speed and supported in horizontal, transversely extending relationship to said feedplate at its discharge end in underlying and parallel relationship to said discharge end edge for receiving of fluid discharging from said feedplate onto upwardly facing surface portions of said roller, said roller having a plurality of radially outward extending projections formed thereon in relatively spaced apart relationship and distributed around the periphery thereof in a predetermined pattern over at least the axial length of said roller receiving the fluid discharged thereon whereby fluid received from the discharge end edge of said feedplate is collected by said roller and its projections and carried around the circular path of movement of said projections to positions where said projections are directed in a generally downward direction and gravity, with the aid of centrifugal force, causes the fluid to be discharged from said roller and its projections and deposited onto the surface of said article to be coated with said fluid when the article is displaced under said roller.

2. Dispensing apparatus according to claim 1 wherein the projections formed on said roller are frustrums.

3. Dispensing apparatus according to claim 2 wherein said projections are of circular cross-section.

4. Dispensing apparatus according to claim 2 wherein said projections are of rectangular cross-section.

5. Dispensing apparatus according to claim 1 wherein said projections are disposed in a plurality of axially extending rows that are angularly spaced around the roller.

6. Dispensing apparatus according to claim 5 wherein said projections in each row are relatively spaced apart a distance at their bases that is less than the dimension of said projection bases in the axial direction of said roller and said projections in adjacent rows are offset axially of said roller a distance to position said projections in one row intermediate adjacent pairs of projections in a next adjacent row.

7. Dispensing apparatus according to claim 1 which includes a second elongated fluid distribution roller of cylindrical configuration supported for revolution in parallel relationship to said first roller and revolved at a predetermined speed, said second roller having a plurality of radially outward extending projections and supported in closely adjacent relationship to said first roller at a position to receive fluid thrown from said first roller, said first and second rollers being revolved in opposite directions with their adjacent peripheral portions moving in a generally upward direction.

8. Dispensing apparatus according to claim 7 wherein said second roller has a plurality of radially outward extending projections formed thereon in relatively spaced apart relationship and distributed around the periphery thereof in a predetermined pattern over at least the axial length of said roller receiving the fluid thrown thereon whereby fluid received from said first roller is collected by said second roller and its projections and carried around the circular path of movement of said projections to positions where said projections are directed in a generally downward direction and gravity, with the aid of centrifugal force, causes the fluid to be discharged from said roller and its projections and deposited onto the surface of said article to be coated with said fluid.

9. Dispensing apparatus according to claim 7 wherein the projections formed on said second roller are frustrums.

10. Dispensing apparatus according to claim 9 wherein said projections on said second roller are of circular cross-section.

11. Dispensing apparatus according to claim 9 wherein said projections on said second roller are of rectangular cross-section.

12. Dispensing apparatus according to claim 7 wherein said projection on said second roller are disposed in a plurality of axially extending rows that are angularly spaced around the roller.

13. Dispensing apparatus according to claim 12 wherein said projections in each row on said second roller are relatively spaced apart a distance at their bases that is less than the dimension of said projection bases in the axial direction of said roller and said projections in adjacent rows are offset axially of said roller a distance to position projections in one row intermediate adjacent pairs of projections in a next adjacent row.

14. Dispensing apparatus according to claim 7 which includes a shield supported in axially extending relationship to said second roller, said shield having a first element disposed in overlying relationship to said second roller to intercept fluid thrown upwardly from said second roller and a second element disposed in a generally vertical plane at a side diametrically opposite from said first roller for limiting throwing of fluid from said second roller in a generally horizontal direction.

15. Dispensing apparatus according to claim 7 wherein said feed-plate and said first roller are relatively positioned to locate the bottom end edge of said feedplate closely adjacent the outer peripheral path of said first roller's projections.

16. Dispensing apparatus according to claim 15 wherein said feed-plate's bottom end edge intercepts said first roller at a point on its periphery at an angular position between 30 and 75 degrees displaced from a vertical plane extending through said first roller's center longitudinal axis.

17. Dispensing apparatus according to claim 7 wherein said second roller is supported at a vertical elevation with respect to said first roller to have a portion thereof disposed below the lowest peripheral extent of said first roller whereby said second roller intercepts a portion of the fluid thrown by said first roller in a horizontal direction to effect confinement of the dispensed fluid.

18. Dispensing apparatus according to claim 7 wherein said first and second rollers are of the same diameter.

19. Dispensing apparatus according to claim 7 which includes a mask mechanism for confining dispensing of fluid onto an article to a predetermined surface area.

20. Dispensing apparatus according to claim 19 wherein said mask mechanism includes a mask plate supported for displacement beneath said first and second rollers and in overlying relationship to an article onto which fluid is to be dispensed, said mask plate being formed with an aperture of a configuration to restrict passage of fluid dispensed from said rollers to an area determined by said aperture's configuration, and displacing means for displacing said mask plate in relationship to an article during the time that fluid is being dispensed onto the article.

21. Dispensing apparatus according to claim 20 wherein said mask mechanism includes a support mechanism for said mask plate operable to effect displacement of said plate in synchronism with an article.

22. Dispensing apparatus according to claim 20 wherein said mask mechanism includes a support mechanism for said mask plate to effect reciprocating displacement of said plate, and actuating means operatively coupled with said support mechanism to effect displacement of said mask plate in synchronism with an article during the time that it is being displaced beneath said rollers.

23. Dispensing apparatus according to claim 20 which includes cleaning means for removal of fluid accumulated on an upper surface of said mask plate.

24. Dispensing apparatus according to claim 23 wherein said cleaning means includes a scraper positioned to engage the upper surface of said mask plate.

* * * * *